Inventor
James B. Henderson
By Moakley & Gill
Attorneys

July 7, 1931. J. B. HENDERSON 1,813,493
APPARATUS FOR INTEGRATING ACCELERATIONS
Filed Feb. 9, 1927 4 Sheets-Sheet 3

Inventor
James B. Henderson
By Moakley & Gill
Attorneys

July 7, 1931.　　J. B. HENDERSON　　1,813,493
APPARATUS FOR INTEGRATING ACCELERATIONS
Filed Feb. 9, 1927　　4 Sheets-Sheet 4

Inventor
James B. Henderson
By Moakley & Gill
Attorneys

Patented July 7, 1931

1,813,493

UNITED STATES PATENT OFFICE

JAMES BLACKLOCK HENDERSON, OF BLACKHEATH, ENGLAND

APPARATUS FOR INTEGRATING ACCELERATIONS

Application filed February 9, 1927, Serial No. 167,043, and in Great Britain February 12, 1926.

My invention relates to integrators to be used on moving bodies, such as ships, for determining the changes in velocity of the body in any given horizontal direction, either fixed or variable, by integrating the component horizontal acceleration of the body in that direction.

For the purpose of my invention I utilize as integrator of the accelerations a level consisting of two vessels containing fluid which is able to flow from one vessel to the other through a connecting passage or tube of restricted bore, this restriction and the viscosity of the fluid being so arranged that any flow of fluid produced by an acceleration of the ship, aircraft or other body on which the instrument is mounted will take place at a rate proportional to the component acceleration of the body parallel with the direction of flow. The total displacement of fluid at any time during the acceleration will therefore be proportional to the time integral of the acceleration, i. e. proportional to the change of velocity of the body parallel with the level, and since all short-period accelerations, such as those due to rolling and pitching of a ship, have an integral value of zero, it follows that the only accelerations which can produce any effect on the level are the sustained accelerations which it is desired to integrate, viz. those producing changes in the speed or course of the craft.

In order to confine the integration to the horizontal component of the acceleration, it is a necessary condition that the free surfaces of the fluid in the level must at all times be maintained on the same true horizontal plane, and since the fluid moves relatively to the level this condition is most simply fulfilled by allowing the level itself to tilt from the horizontal plane by the amount required to keep the fluid surfaces on that plane. Such means being provided, it then only remains to measure continuously the tilt of the level in order to obtain a continuous measure of the displacement of fluid, i. e. a continuous measure of the time integral of the horizontal component acceleration of the craft parallel with the level. My invention includes both the means to effect this control of the level and the means to effect the measurement.

I may control the direction of the level so as to maintain it fixed in azimuth or fixed relatively to the ship, if necessary using two similar instruments at right angles to each other to determine changes in co-ordinate speeds, but one of the most valuable and novel features of the present invention enables me to do something which I believe has never before been attempted, viz. to integrate the acceleration of the craft in a direction which is variable both in relation to the craft and in azimuth.

Briefly described, the complete invention consists of a level of the type described, preferably pivoted on a horizontal support and controlled by springs arranged to apply to the level, on any tilt of the body of the level relatively to the support, a torque equal and opposite to the gravity torque on the level due to the displacement of fluid produced by that tilt. That is to say, the level is in neutral equilibrium and if the support is kept truly horizontal the free surfaces of the fluid will also remain on the same true horizontal plane irrespective of the tilt of the level. I keep the support of the level horizontal, say by attaching it to the stabilized prisms of a gyro-telescope of the type described in my prior Patent No. 1,553,077 which is kept laid on the horizon by an observer. The gyroscope eliminates from the line of sight of the telescope, and from the level, any angular movement due to rolling or pitching of the ship in the vertical plane of the line of sight, while any movement due to tilting or straying of the gyroscope is eliminated by a manual adjustment between the gyroscope and the stabilized prisms and level support. The only external disturbance which can then have any effect on the level is the acceleration whose time integral has to be measured and to enable its value to be determined I preferably employ optical means to give a magnified indication of the tilt of the lever relatively to the horizontal stabilized support. A collimator consisting of a lamp, graticule and objective is virtually, but not actually, carried by the level and its beam is bent back by double reflection in two planes into the objective of the telescope, by which it is focussed on the focal plane of the telescope, providing a luminous image of the collimator graticule on the crosswires of the telescope eyepiece, superimposed on the image of the horizon. When the level is horizontal this luminous image coincides with the horizontal cross-wire, and when the level support is horizontal the image of the horizon is also on the horizontal cross-wire. The vertical cross-wire is engraved both up and down from the centre in a scale of knots or other convenient notation. If, therefore, the observer at the telescope keeps his sight carefully laid on the horizon he will keep the support of the level truly horizontal and any movement of the luminous image in his field of view up or down the scale on his vertical cross-wire will indicate accurately and continuously the change of velocity, positive or negative, along the line of sight of his telescope, in whatever direction the sight be trained.

A clear comprehension of the operation of the invention will be gained from the following detailed description.

In the accompanying drawings, in which a preferred form of the invention is illustrated, Fig. 1 gives a sectional elevation of the instrument looking along the line of sight.

Fig. 6 is an elevation showing the instrument mounted on a pedestal.

The larger part of the instrument is a telescope of the type described in my U. S. Patent No. 1,553,077 in which part of the optical system, namely a prism combination, is stabilized by a gyroscope so that the image seen in the field of view is stationary relatively to the cross wires of the telescope in spite of the rolling motion of the ship. The supporting bracket 1 is mounted on a pedestal 82 on deck, see Fig. 6, on which it can be trained about an axis at right angles to the deck of the ship, by means of hand-wheel 81, and may be of any suitable form for attachment to any convenient training member on the ship. The training operation may be manual or may be automatically controlled from the ship's gyro compass or other controlling centre.

Figure 1:
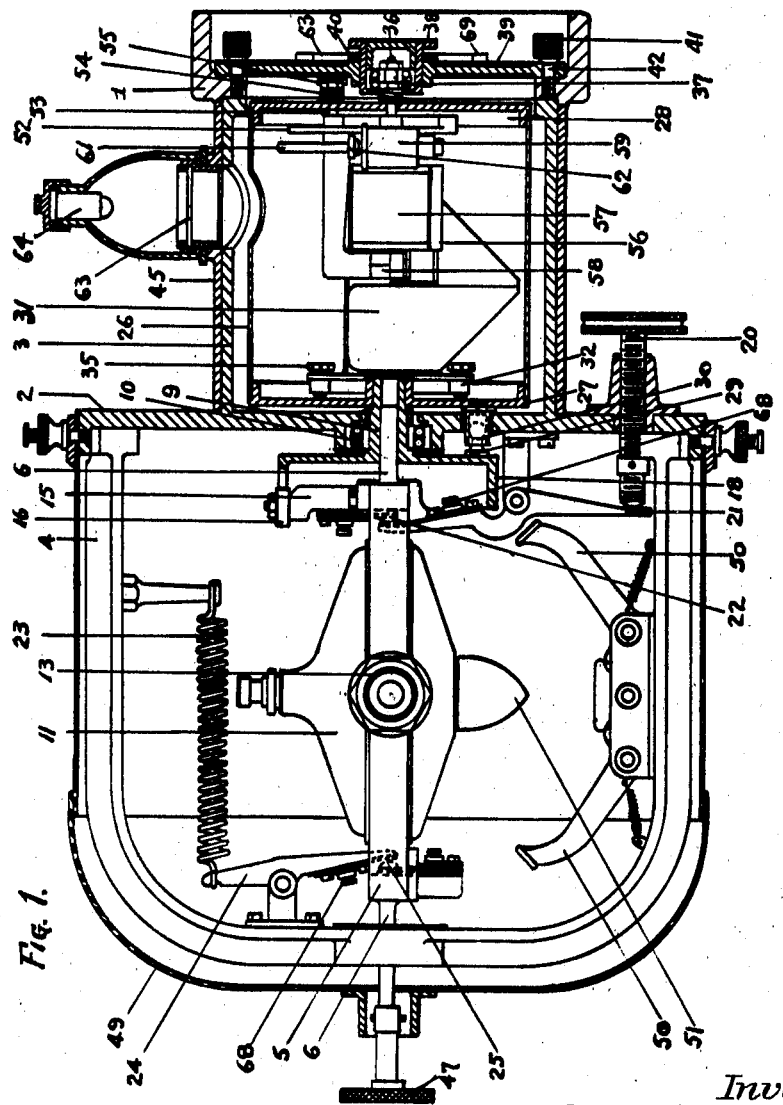
Figure 2:
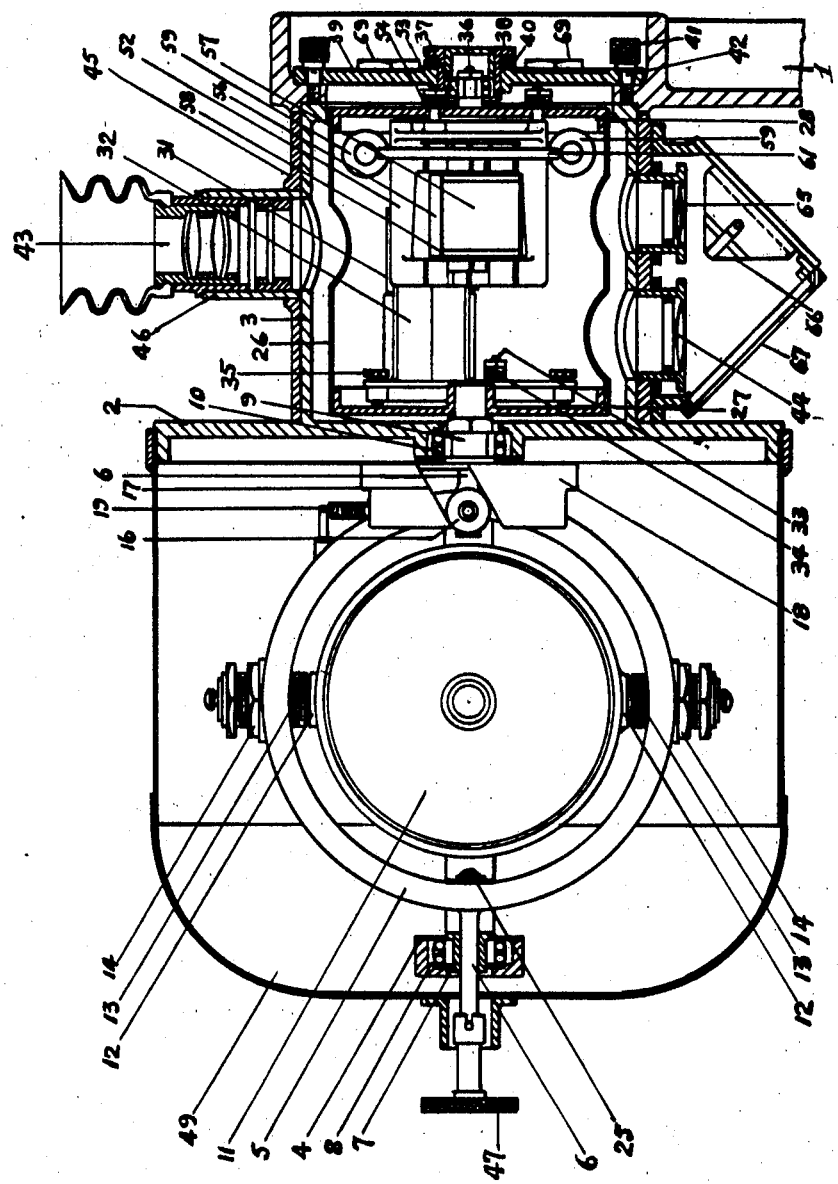
Fig. 2 is a sectional plan.

The face plate 2, which has a cylindrical projection 3, is fixed to the bracket 1 and carries the U-shaped bridge-piece 4. The gimbal ring 5 is mounted on trunnions 6, the left trunnion being carried by the sleeve 7 (Fig. 2) in a ball bearing 8 in the bridge-piece 4, and the right hand trunnion by a sleeve 9 (Fig. 1) in a ball bearing 10 in the centre of the face-plate 2. The gyroscope 11 is mounted in neutral equilibrium on trunnions 12 in ball bearings in the screwed sleeves 13 which are screwed into the gimbal ring 5 and held by locking nuts 14. A pillar 15 fixed to the gimbal ring 5 carries a roller 16 which engages with a spiral slot 17 in a cup-shaped extension 18 of the sleeve 9. A coil spring 19 (Fig. 2) having one end attached to the gimbal ring and the other end attached to the cup 18 holds the roller 16 against one side of the slot 17. The gimbal ring 5 can be displaced along the axis of the trunnions 6 by means of a screw 20 which presses against one end of a rocking lever 21 the other end of which presses on a ball 22 fixed to the gimbal ring 5 in line with its trunnion axis, the motion being resisted by the spring 23 pulling on one end of a second rocking lever 24 and so pressing its other end against a ball 25 on the gimbal ring diametrically opposite the ball 22. It will be seen that this endwise motion of the gimbal ring, by moving the roller 16 carried by the gimbal ring in one direction or the other along the spiral slot 17, causes the cup 18 and the sleeve 9 to rotate relatively to the trunnion 6.

Figure 3:
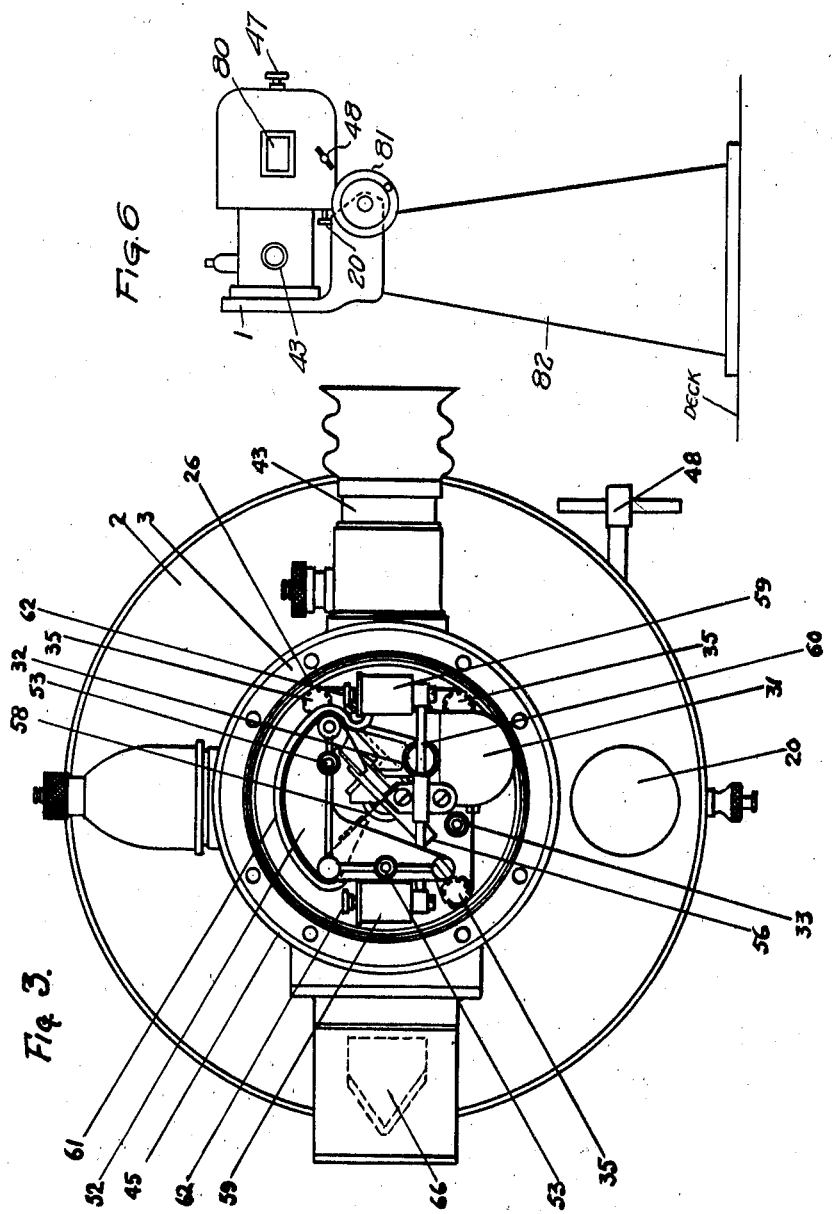
Fig. 3 is an elevation, looking at right angles to the line of sight, certain parts being supposed to have been removed to disclose the internal arrangements.
Figure 4:
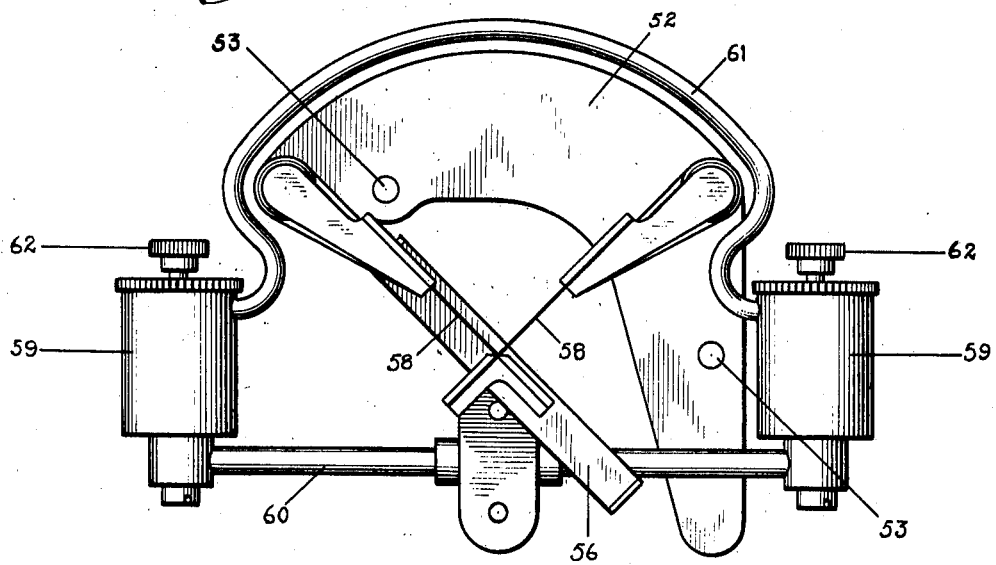
Fig. 4 is an elevational view of the level and its support detached from the rest of the instrument.
Figure 5:
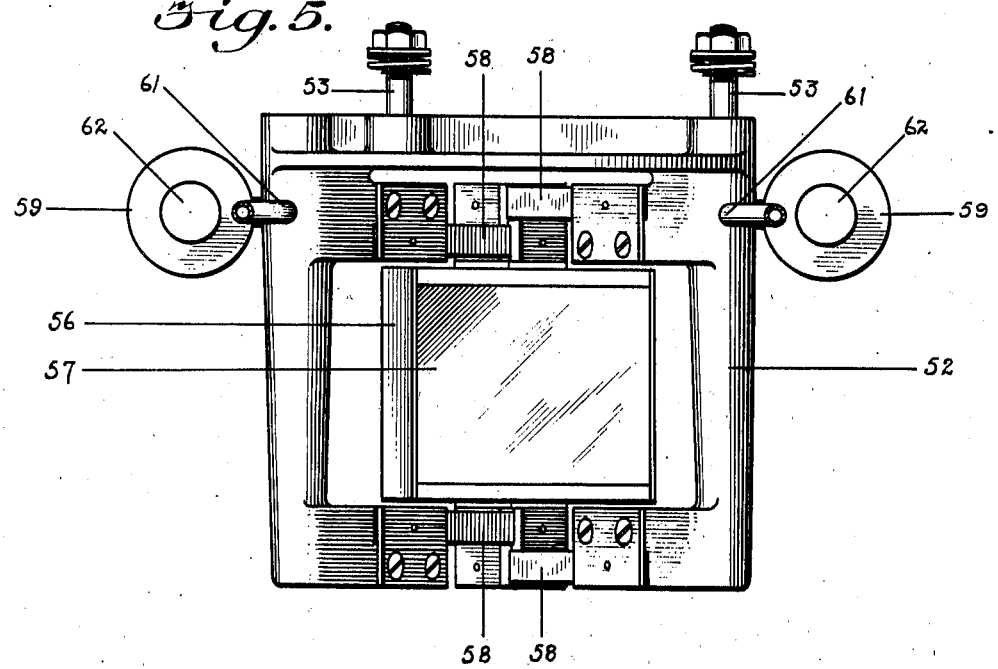
Fig. 5 is a plan view of the parts shown in Fig. 4.

A cylindrical drum 26 having its ends closed by two discs 27 and 28 is constrained to move with the sleeve 9 by means of a ball-headed pin 29 (Fig. 1) fixed to the cup 18 engaging with a cup 30 fixed to the disc 27, an internal spring (not shown) holding the ball 29 against one side of the cup 30 to prevent backlash. The inverting prisms 31 of the telescope are carried in the prism holder 32 which is fixed adjustably to the disc 27 by means of two bolts 33 (Figs. 2 and 3) on which are threaded coil springs 34 pressing the three micrometer screws 35 carried by the prism holder 32 against a hole, slot and plane in the disc 27. The drum 26 is carried at one end by the sleeve 9 engaging with a hole in the centre of the disc 27, and at the other end by a trunnion 36 in the centre of the disc 28 engaging with a ball bearing 37 in a screwed sleeve 38 carried by the end plate 39. It will be seen that the drum can be moved endwise for adjustment of the prisms by turning the screwed sleeve 38 and locking it in position by means of the locking nut 40. It can also be removed conveniently along with the end plate 39 by turning the four milled nuts 41 on the studs 42 which pass through bayonet slots in the cover 39. The eyepiece 43 and objective 44 are mounted on a sleeve 45 carried by a cylindrical projection 3 on the face plate, the graticule 46 of the eyepiece and the optical centre of the objective 44 being equidistant from the axis of the trunnions 6. The knob 47 on the end of the trunnion 6 enables the observer to precess the gyroscope 11 about its trunnions 12 to bring its axis approximately vertical, and the handle 48 (Fig. 3) projecting from the dome cover 49 enables him to precess the gyroscope about the trunnions 6 by causing one or other of the levers 50 (Fig. 1) to bear on the oil cup 51 fixed to the bottom of the gyroscope casing. The knob on the screw 20 enables him to compensate the telescope for any straying of the gyroscope about the trunnions 6 by turning the drum 26 containing the prisms relatively to the gimbal ring 5.

The parts so far described constitute the stabilized telescope, and the additional parts now to be described provide the means for integrating the component accelerations of the ship along the line of sight and for obtaining readings of the change of speed along that line.

A bracket 52 fixed to the drum 26 and therefore stabilized by the gyroscope carries, virtually pivoted on it, a level 59 and a mirror holder 56 containing a mirror 57. The bracket 52 is attached adjustably to the disc 28 in a manner similar to that in which the prism holder 32 is attached to the disc 27, namely by means of bolts 53 with coil springs 54 and the micrometer screws 55 engaging with a hole, slot and plane on the bracket 52. The mirror holder 56 is suspended from the bracket 52 by two pairs of crossed flat springs 58 and has fixed to it the level, consisting of two buckets 59 connected by a small-bore tube 60 and an air tube 61. It will be seen that the level is supported solely by the springs 58, but I may also fit a clamp of any suitable type for clamping the level rigidly to the bracket 52 when not in use as an integrator, and also a damper between the level and the bracket to damp any oscillations of the level on its spring support. To avoid unimportant detail in the drawings these two features are not illustrated.

The buckets 59 are partially filled with viscous fluid which may be mercury, and may have screw-down valves 62 fitted to them for regulating the flow of fluid. I may graduate these valves in degrees of temperature and use them to adjust the rate of flow in accordance with changes in temperature.

The mirror and level are virtually pivoted on the bracket 52 by the springs, on which they are also balanced so that if the level is tilted, the gravity couple due to displacement of fluid from one bucket to the other is the only gravity couple acting on the gyroscope, and I adjust the stiffness of the springs 58 so that the level, instead of being in unstable equilibrium, is actually in neutral equilibrium for any displacement of fluid so long as the telescope is laid on the horizon. That is to say, the gravity couple per unit angle of displacement of the level is equal to the spring couple per unit angle of displacement. The gravity couple due to the displacement of fluid is necessarily balanced by the spring torque on the level but with the above adjustment the free surfaces in the two buckets will remain in the same true horizontal plane when the telescope is properly laid on the horizon and there will be no tendency for the fluid to flow in either direction except for any tendency produced by a horizontal acceleration.

The tilt of the level 59 and mirror 57, which indicates the amount of fluid displaced at any time in the level, is measured by means of a collimator of novel form which is virtually, but not actually, attached to the level. The graticule 63, lamp 64 and objective 65, all carried by the sleeve 45, together with the mirror 57, constitute this luminous collimator, the beam from which is reflected by the roof prism 66 and the plain glass reflector 67, both of which are carried by the sleeve 45, into the objective of the horizontal telescope. The graticule 63 and the optical centre of the objective 65 are equidistant from the axis of the drum 26, which causes the beam from the graticule 63 after reflection in the mirror 57 and emerging from the objective 65 to remain horizontal so long as the reflecting surface of the mirror 57 remains inclined at 45° to the horizontal, even through the unstabilized parts of the collimator may be rolling about the axis of the drum 26 due to rolling or pitching of the ship. Also if the mirror 57 rotates about the axis of the trunnion 6 the beam emerging from objective 65 will rotate with it through the same angle. Moreover if the beam leaves the objective 65 horizontally it will enter the telescope objective 44 horizontally, due to the double reflection in the roof prism 66 and single reflection in the window 67. Thus, if on looking through the eyepiece 43 the luminous cross-lines of the graticule 63 are seen to coincide with the cross-lines of the graticule 46, they will remain coincident so long as the gyroscope does not stray or the mirror 57 does not tilt. Now the effects of straying of the gyroscope are compensated by the operator manipulating the screw adjustment 20 so as to keep the image of the horizon on the horizontal cross-wire of his graticule. If therefore the operator keeps the horizon on his horizontal cross-wire, any movement of the luminous image of the graticule 63 relatively to the cross-wire of his telescope can only be produced by tilting of the level, and that tilting can only be produced by a change of velocity of the ship along the line of sight of the main telescope.

Now since the anchorage of the level springs is stabilized by the gyroscope and is kept continuously horizontal by the operation of keeping the line of sight laid on the horizon and the stiffness of the springs is arranged so that when fluid is displaced from one side of the level to the other the two free fluid surfaces remain on the same true horizontal plane, the head driving the flow through the level is therefore proportional to the horizontal acceleration. Also, since the rate of flow of a viscous fluid in a small bore tube is simply proportional to the head driving it, the fluid displaced in the level, being the time integral of the rate of flow, is simply proportional to the time integral of the component acceleration parallel to the level, that is to say, the fluid displaced in the level and the tilt of the level and mirror produced thereby, are proportional to the change of velocity parallel to the line of sight of the telescope, and this latter quantity can therefore be measured by the tilt of the mirror or by the corresponding movement of the luminous crosslines relatively to the fixed cross lines of the telescope.

I fit a scale on the vertical cross-wire of the graticule 46 and graduate it in knots or other suitable divisions both upwards and downwards from the centre, so that movement upwards or downwards of the luminous image from one division to the next will represent respectively an increase or a decrease of 1 knot in the component velocity of the ship along the line of sight of the telescope.

Current is led to the gyroscope as described in my Patent No. 1,553,077 through the ball contacts 22 and 25 on the gimbal ring from terminals 68 on the rocking levers 21 and 24, and access to the micrometer screws 35 and 55 for adjustment of the prisms 31 and mirror 57 is obtained by removing the plugs 69 from the end plate 39.

Having described the instrument I shall now describe some of the purposes to which the invention is applicable and the manner in which the instrument is to be used.

The principal uses of the instrument occur when the ship or body on which it is mounted is turning. It is well known that during a turn a ship does not move along her fore-and-aft line and also that the indications of speed given by the log are inaccurate during that time. Yet it has so far been impossible to determine the exact behavior of a ship under these conditions or to determine to what degree the log is reliable.

My invention measures the change of velocity of the ship in the direction parallel to the level, or parallel to the line of sight of the telescope. If, therefore, during a turn of the ship the telescope is kept trained along the ship's fore-and-aft line and carefully laid continuously on the horizon, the scale reading will show continuously the change of component velocity along the fore-and-aft line.

If the instrument is controlled in azimuth by a gyro compass it will accurately determine the change of velocity in the fixed direction in azimuth in which it is so controlled. Hence two instruments mounted on the ship and both trained by compass, one telescope pointing N—S and the other E—W, would give the component changes of velocity in these two cardinal directions, from which the changes in other directions could be determined. This method, however, is rather cumbersome.

A simple way to use the instrument consists in training it continuously on an external object or other ship, which may be fixed or moving, so as to determine the change of velocity of the ship along the line of sight to the external object. In this case only one instrument is required and the telescope is kept continuously trained on the external object and laid on the horizon at the same time. The instrument then integrates the component acceleration of "own ship" along the moving line of sight between the ship and the external object or other ship, that is to say, in mathematical language, the component acceleration due to own ship along the radius vector of the curve of relative motion of the two ships. The acceleration along the radius vector of this curve, however, is $$\frac{d^2r}{dt^2} - r\left(\frac{d\theta}{dt}\right)^2$$

in which $r$ is the range and $$\frac{d\theta}{dt}$$

the rate of change of bearing, and the component of this quantity due to own ship is properly integrated by the level. The velocity along the line of sight, however, is $$\frac{dr}{dt}$$

and is only the integral of the first term of the acceleration. If, for example, the ship were steaming in a circle about another fixed ship, the radial acceleration is only the second term—

$$r\left(\frac{d\theta}{dt}\right)^2$$

i. e. the centrifugal acceleration, and the radial velocity is zero, yet the time integral of the radial acceleration given by the level increases at a steady rate and rightly so, because it gives the arc of the hodograph or curve of change of velocity, which during one complete circle of the ship is $2\pi V$ if $V$ is the ship's speed. The arc of the hodograph gives the complete change of velocity (not speed) in the interval. The terminal velocity is not a good measure of what has happened during the interval of change, whereas the hodograph gives the complete history of the change and the length of the arc of the hodograph is a good measure of all that has happened during the period of change. When both ships are steaming the level gives the length of that portion of the arc of the hodograph which is contributed by own ship's speed and provides a good check.

I may use my invention in conjunction with other instruments into which the factor of ship's speed enters. For instance in my system of compensating gyro compasses described in co-pending applications Serial Nos. 427,424 and 576,480 I have to apply an adjustment in proportion to changes in the ship's speed and course. The course is given accurately by the compass itself but for the speed I have to rely on the log or other inaccurate sources. When the greatest accuracy is required I may therefore use the present invention as a check on the speed adjustment applied to the compass, or since the net adjustment of the compass is in proportion to changes in the speed of the ship along the meridian, I may keep the integrator oriented on the meridian by means of the compass and derive from it a single control proportional to changes in the meridional speed of the ship which could be applied to the compass in place of the dual control in the prior inventions referred to, or else used as a check on the combined control originally proposed in proportion to changes in course and speed.

During the operation of the instrument the observer will have to look at the gyro from time to time to see that it maintains its rotor axis substantially vertical. For this purpose the dome 49 is furnished with windows 80 (one being shown in Fig. 6) through which the gyro can be seen, and if it has tilted far from the vertical about either trunnion axis, it has to be precessed back to near the vertical by means of the adjustment handles 47 and 48. Since the gravity torque on the gyro is very small its rate of precession away from the vertical is very slow, so that this attention is only required at infrequent intervals because the gyro can tilt to a considerable angle about the trunnions 12 before the accuracy of the instrument becomes impaired. Tilting of the gyro about the trunnion 6, if uncompensated, would have an immediate and serious effect on the operativeness of the instrument, but the action of the observer in keeping his fixed crosswire laid on the horizon automatically compensates for this straying by rotating the drum 26 with the prisms and level about the trunnion axis 6 relatively to the gyro, and the actual tilt of the gyro need only be corrected at intervals.

I claim:—

1. Mechanism for determining the change of velocity of a body in a horizontal plane, comprising a horizontal support mounted for translation with the body, a level pivoted on said support on an axis at right angles to the direction of motion of the body, a fluid contained within said level and adapted to flow at a rate proportional to the acceleration of the body, and means constraining the movement of the level about said axis so that the level is in neutral equilibrium as regards displacement of fluid in the level.

2. Mechanism for determining the change of velocity of a body in a given horizontal direction, comprising a level mounted for pivotal movement relatively to the body on an axis at right angles to said direction and translatable with the body, a fluid contained within said level and adapted to be displaced therein by an acceleration of the body at a rate proportional to said acceleration, and means for constraining the pivotal movement of the level so that the level is in neutral equilibrium about said axis as regards fluid displacement in the level.

3. Mechanism for determining the change of velocity of a body in a given horizontal direction, comprising a horizontal support mounted for translation with the body, a level pivoted on said support on an axis at right angles to said direction, a fluid contained within said level and adapted to be displaced therein by an acceleration of the body in said direction at a rate proportional to said acceleration, and yielding means connecting the level to the support constraining the pivotal movement of the level about said axis so that the level is in neutral equilibrium for any displacement of fluid in the level.

4. Mechanism for determining the change of velocity of a body in a given fixed or variable horizontal direction, comprising a horizontal support mounted on the body for translation therewith, a level pivoted on said support on a horizontal axis, means to align the level with said direction, a fluid contained within said level having spaced free surfaces and adapted to be displaced through the level by an acceleration of the body parallel to the level at a rate proportional to said acceleration, and restraining means connecting the level to its support arranged to keep the two free surfaces of fluid on the same horizontal plane in any distribution of fluid.

5. Mechanism for continuously determining the change of velocity of a body in a given fixed or variable horizontal direction, comprising a support translatory with the body, a level containing fluid displaceable therein, the fluid having separated free surfaces and being adapted to flow at a rate proportional to the component acceleration of the body parallel to the level, means to keep the level aligned with said direction, means to maintain said support horizontal, and springs anchored to said support and suspending the level in neutral equilibrium as regards fluid displacement therein, whereby the displacement of said level relatively to the support during an acceleration of the body is proportional to the change of velocity of the body in said direction.

6. Mechanism for continuously determining the change of velocity of a body in given fixed or variable horizontal direction, comprising a sighting device, a level pivoted on a support mounted for training movement and translation with the body and containing fluid displaceable therein the fluid having spaced free surfaces, means to maintain the level parallel with line of sight from said sighting device to a distant object, and means to keep the free surfaces of the fluid in the level on the same true horizontal plane in any distribution of the fluid, the fluid being adapted to flow at a rate proportional to the component acceleration of the body parallel to said level.

7. Mechanism for continuously determining the change of velocity of a body in a given fixed or variable horizontal direction, comprising a support translatory with the body a level carried by and movable with respect to said support, said level containing fluid displaceable therein and having separated free surfaces, means to keep the level aligned with said direction, constraining means between the level and support to keep the free surfaces of the fluid in the level on the same true horizontal plane, the fluid being adapted to flow at a rate proportional to the component acceleration of the body parallel to said level, and means by which the relative movement of the level and its support effects an indication of the displacement of the fluid.

8. Mechanism for continuously determining the change of velocity of a body in a given fixed or variable horizontal direction, comprising a level pivotally mounted on a support for translation with the body and containing fluid displaceable therein the fluid having separated free surfaces, means to keep said level aligned with said direction, constraining means between the level and support to keep the free surfaces of the fluid in the level on the same true horizontal plane in any distribution of the fluid, the fluid being adapted to flow at a rate proportional to the component acceleration of the body parallel to said level, and optical means to effect an indication of the displacement of the fluid.

9. Mechanism for continuously determining the change of velocity of a body in a given fixed or variable horizontal direction, the body being subject to angular movements, said mechanism comprising a level mounted for translation with and for angular displacement relative to the body, said level containing fluid displaceable therein the fluid having spaced free surfaces, means to keep said level aligned with said direction, constraining means between the level and support to keep said free surfaces of the fluid in the level on the same true horizontal plane in any distribution of the fluid, the fluid being adapted to flow at a rate proportional to the component acceleration of the body parallel to said level, and means producing a luminous beam stabilized with respect to the angular movements of the body but unstabilized as to the angular movements of the level to effect an indication of the displacement of the fluid.

10. Mechanism for continuously determining the change in velocity of a body in a given horizontal direction, the body being angularly movable, said mechanism comprising an angularly displaceable level translatory with said body and containing fluid having spaced free surfaces, means to keep said level aligned with said direction, means to keep said free surfaces of the fluid on the same true horizontal plane, the fluid being adapted to flow at a rate proportional to the component acceleration of the body parallel to said level, and a collimator comprising a lamp, a graticule and an objective lens moving with the body and a reflector attached to said level midway between the graticule and objective lens, said collimator effecting an indication of the displacement of the fluid by a luminous beam stabilized with respect to said angular movements of the body and unstabilized as to the angular movements of the level.

11. Mechanism for continuously determining the change in velocity of a body in a given fixed or variable horizontal direction, comprising a gyroscope, a sighting device having optical parts stabilized thereby and provided with an objective lens, a level adapted to tilt and being translatory with the body, said level containing fluid having spaced free surfaces, means to keep said level aligned with said direction, means to keep said free surfaces of the fluid on the same true horizontal plane, the fluid being adapted to flow at a rate proportional to the component acceleration of the body parallel to said level, a collimator emitting a luminous beam and optical elements to reflect the beam into the objective of said sighting device to be normally parallel with the line of collimation of the sighting device, whereby an image of the collimator graticule is focussed on the focal plane of the sighting device and is stabilized thereon except for movement imparted to it by movements of said level.

12. Mechanism for continuously determining the change in velocity of a body in a given fixed or variable horizontal direction, comprising a gyroscope, a sighting device having optical parts stabilized thereby and a fixed scale in its focal plane, a level adapted to tilt and being translatory with the body, said level containing fluid having spaced free surfaces, means to keep said level aligned with said direction, means to keep said free surfaces of the fluid on the same true horizontal plane, the fluid being adapted to flow at a rate proportional to the component acceleration of the body parallel to said level, a movable luminous collimator having a graticule co-acting with a light beam, and means forming a luminous image of said graticule in the focal plane of the sighting device, whereby movement of the image on said fixed scale continuously indicates the displacement of fluid in the level.

13. Mechanism for continuously determining the change of velocity of a body in a given fixed or variable horizontal direction, comprising a gyroscope mounted on the body, a horizontal support translatory with the body and gyroscope and stabilized by the latter, a level containing fluid displaceable therein the fluid having separated free surfaces, means to keep said level aligned with said direction, springs anchored to said support suspending said level in neutral equilibrium from the support as regards fluid displacement, whereby the free surfaces of the fluid are kept on the same true horizontal plane, the fluid being adapted to flow at a rate proportional to the component acceleration of the body parallel to said level.

14. Mechanism for continuously determining the change of velocity of a body in a given fixed or variable horizontal direction, comprising a sighting device, a support translatory with the body, a level containing fluid displaceable therein the fluid having separated free surfaces, means to keep said level aligned with said direction, springs anchored to said support suspending said level in neutral equilibrium from the support as regards fluid displacement in the level, means maintaining said support horizontal by keeping the line of said sighting device continuously laid upon the horizon, said line of sight being fixed parallel with the support, whereby the free surfaces of the fluid are kept on the same true horizontal plane, the fluid being adapted to flow at a rate proportional to the component acceleration of the body parallel to said level.

15. Mechanism for continuously determining the change of velocity of a body in a given fixed or variable horizontal direction, comprising a gyroscope, a sighting device and a support translatable with the body, springs anchored to said support and supporting a level parallel to the line of sight of said device, a fluid contained in said level having two spaced free surfaces and adapted to be displaced through the level at a rate proportional to the acceleration of the body parallel to the level, said springs being arranged to keep said free surfaces on the same horizontal plane so long as the support is horizontal in any distribution of the fluid, connections between the gyroscope, sighting device and support for stabilizing the device and support horizontally, means to adjust the device and support relatively to the gyroscope and means to keep the level aligned with said direction by training the device relatively to the body.

16. Mechanism for continuously determining the change of velocity of a body in a given fixed or variable horizontal direction comprising a horizontal support translatory with the body, a level containing fluid displaceable therein the fluid having separated free surfaces, means to keep said level aligned with said direction, springs anchored to said support and suspending said level therefrom so that it may tilt, said springs being adapted to apply for a given displacement of the level from the horizontal, a torque equal and opposite to the gravity torque due to the displacement of the fluid produced by said displacement of the level relatively to its horizontal support, whereby the free surfaces of the fluid are maintained in the same true horizontal plane, the fluid being adapted to flow at a rate proportional to the component acceleration of the body parallel to the level.

17. In combination, a fluid level for use on a moving body and adapted to integrate the component acceleration of the body in a direction parallel with the level, a horizontal support therefor, and a spring connection between the level and support adapted to place the level in neutral equilibrium as regards displacement of fluid in the level.

18. In combination, a level for use on a moving body containing fluid displaceable therein and adapted to integrate the component acceleration of the body in a direction parallel with the level, a horizontal support therefor, a spring connection between the support and the level adapted to place the level in neutral equilibrium as regards displacement of the fluid, and means to indicate the displacement of the fluid in the level.

19. In combination, a level for use on a moving body and comprising spaced chambers in mutual communication, there being fluid in said chambers having free surfaces, the fluid extending from chamber to chamber, a horizontal support for said level and a spring control between said level and said support to maintain the free surfaces of fluid on the same true horizontal plane during the acceleration of the body, said level being adapted to integrate the component acceleration of the body in a direction parallel with the level.

20. In apparatus for integrating accelerations of a moving body, optical means to indicate a horizontal datum in a given fixed or variable horizontal direction, means to produce a displacement in proportion to the time integral of the horizontal component acceleration of the body in said direction, optical means to indicate said displacement, means to superpose the two indications on each other, and a scale to measure their relative movement.

In testimony whereof I affix my signature.

JAMES BLACKLOCK HENDERSON.